(12) United States Patent
Sharos et al.

(10) Patent No.: US 12,387,092 B1
(45) Date of Patent: Aug. 12, 2025

(54) NEURAL NETWORK LOSS FUNCTION THAT INCORPORATES INCORRECT CATEGORY PROBABILITIES

(71) Applicant: Amazon Technologies, Inc., Seattle, WA (US)

(72) Inventors: Philip Sharos, Limerick (IE); Steven L. Teig, Menlo Park, CA (US)

(73) Assignee: Amazon Technologies, Inc., Seattle, WA (US)

( * ) Notice: Subject to any disclaimer, the term of this patent is extended or adjusted under 35 U.S.C. 154(b) by 394 days.

(21) Appl. No.: 18/115,553

(22) Filed: Feb. 28, 2023

Related U.S. Application Data

(60) Provisional application No. 63/388,044, filed on Jul. 11, 2022.

(51) Int. Cl.
  *G06N 3/06* (2006.01)
  *G06N 3/063* (2023.01)
  *G06V 10/774* (2022.01)

(52) U.S. Cl.
  CPC ........... *G06N 3/063* (2013.01); *G06V 10/774* (2022.01)

(58) Field of Classification Search
  CPC .............................. G06N 3/063; G06V 10/774
  USPC ........................................................ 382/156
  See application file for complete search history.

(56) References Cited

U.S. PATENT DOCUMENTS

| | | | |
|---|---|---|---|
| 4,866,634 A | 9/1989 | Reboh et al. | |
| 5,255,347 A | 10/1993 | Matsuba et al. | |
| 5,579,436 A | 11/1996 | Chou et al. | |
| 6,601,052 B1 | 7/2003 | Lee et al. | |
| 6,985,781 B2 | 1/2006 | Keeler et al. | |
| 7,333,923 B1 | 2/2008 | Yamanishi et al. | |
| 8,000,538 B2 | 8/2011 | Sarkar | |
| 8,145,662 B2 | 3/2012 | Chen et al. | |
| 9,373,087 B2 | 6/2016 | Nowozin | |
| 10,019,654 B1 | 7/2018 | Pisoni | |
| 10,586,151 B1 | 3/2020 | Teig | |
| 10,671,888 B1* | 6/2020 | Sather | G06N 3/045 |
| 11,475,310 B1* | 10/2022 | Teig | G06N 3/084 |

(Continued)

OTHER PUBLICATIONS

Chen, Minghua, et al., "Markov Approximation for Combinatorial Network Optimization," IEEE Transactions on Information Theory, Oct. 2013, 27 pages, vol. 59, No. 10, IEEE.

(Continued)

*Primary Examiner* — Neil R McLean
(74) *Attorney, Agent, or Firm* — K&L Gates LLP

(57) ABSTRACT

Some embodiments provide a method for training a machine-trained (MT) network to classify inputs into multiple categories. The method propagates a set of input training items through the MT network to generate a set of corresponding outputs. Each input training item belongs to a category and the output for each input training item includes, for each category, a computed probability of the input belonging to the category. The method computes a value for a loss function based on the generated outputs. The loss function includes a first term based on the computed probabilities of each input belonging to its category and not based on individual computed probabilities of the inputs belonging to other categories and a second term based on the individual computed probabilities of each input belonging to each of the categories. The method uses the computed value for the loss function to train the MT network.

20 Claims, 7 Drawing Sheets

(56) References Cited

U.S. PATENT DOCUMENTS

| | | |
|---|---|---|
| 2003/0033263 A1 | 2/2003 | Cleary |
| 2004/0243954 A1 | 12/2004 | Devgan et al. |
| 2006/0010093 A1 | 1/2006 | Fan et al. |
| 2007/0078630 A1 | 4/2007 | Filatov et al. |
| 2007/0239642 A1 | 10/2007 | Sindhwani et al. |
| 2007/0271287 A1 | 11/2007 | Acharya et al. |
| 2008/0256011 A1 | 10/2008 | Rice |
| 2009/0106173 A1 | 4/2009 | Andrew et al. |
| 2010/0082639 A1 | 4/2010 | Li et al. |
| 2011/0105346 A1 | 5/2011 | Beattie et al. |
| 2011/0120718 A1 | 5/2011 | Craig |
| 2011/0182345 A1 | 7/2011 | Lei et al. |
| 2012/0271791 A1 | 10/2012 | Laan et al. |
| 2012/0283992 A1 | 11/2012 | Ji et al. |
| 2012/0331025 A1 | 12/2012 | Gemulla et al. |
| 2013/0257873 A1 | 10/2013 | Isozaki |
| 2014/0124265 A1 | 5/2014 | Al-Yami et al. |
| 2014/0207837 A1 | 7/2014 | Taniguchi et al. |
| 2014/0222747 A1 | 8/2014 | Zhou et al. |
| 2015/0100530 A1 | 4/2015 | Winih et al. |
| 2015/0161995 A1 | 6/2015 | Sainath et al. |
| 2015/0262083 A1 | 9/2015 | Xu et al. |
| 2016/0132786 A1 | 5/2016 | Balan et al. |
| 2016/0260222 A1 | 9/2016 | Paglieroni et al. |
| 2017/0061326 A1 | 3/2017 | Talathi et al. |
| 2017/0068844 A1 | 3/2017 | Friedland |
| 2017/0091615 A1 | 3/2017 | Liu et al. |
| 2017/0140298 A1 | 5/2017 | Wabnig et al. |
| 2017/0154425 A1 | 6/2017 | Pierce et al. |
| 2017/0161640 A1 | 6/2017 | Shamir |
| 2017/0183836 A1 | 6/2017 | Ahmed et al. |
| 2017/0262735 A1 | 9/2017 | Sanchez et al. |
| 2018/0033024 A1 | 2/2018 | Latapie et al. |
| 2018/0068221 A1 | 3/2018 | Brennan et al. |
| 2018/0101783 A1 | 4/2018 | Savkli |
| 2018/0174041 A1 | 6/2018 | Imam et al. |
| 2018/0219888 A1 | 8/2018 | Apostolopoulos |
| 2019/0005358 A1 | 1/2019 | Pisoni |
| 2019/0230913 A1 | 8/2019 | Chen et al. |
| 2019/0286970 A1 | 9/2019 | Karaletsos et al. |
| 2020/0007934 A1 | 1/2020 | Ortiz et al. |
| 2020/0249996 A1 | 8/2020 | Addepalli et al. |
| 2023/0040889 A1 | 2/2023 | Teig et al. |

OTHER PUBLICATIONS

Duda, Jarek, "Asymmetric Numeral Systems: Entropy Coding Combining Speed of Huffman Coding with Compression Rate of Arithmetic Coding," Jan. 6, 2014, 24 pages, arXiv:1311.2540v2, Computer Research Repository (CoRR)—Cornell University, Ithaca, NY, USA.

Eisele, Robert, "The log-sum-exp trick in Machine Learning," Computer Science & Machine Learning, Jun. 22, 2016, 3 pages.

Emer, Joel, et al., "Hardware Architectures for Deep Neural Networks," CICS/MTL Tutorial, Mar. 27, 2017, 258 pages, Massachusetts Institute of Technology, Cambridge, MA, USA, retrieved from http://www.rle.mit.edu/eems/wp-content/uploads/2017/03/Tutorial-on-DNN-CICS-MTL.pdf.

Huang, Gao, et al., "Multi-Scale Dense Networks for Resource Efficient Image Classification," Proceedings of the 6th International Conference on Learning Representations (ICLR 2018), Apr. 30-May 3, 2018, 14 pages, ICLR, Vancouver, Canada.

Jain, Anil K., et al., "Artificial Neural Networks: A Tutorial," Computer, Mar. 1996, 14 pages, vol. 29, Issue 3, IEEE.

Li, Hong-Xing, et al., "Interpolation Functions of Feedforward Neural Networks," Computers & Mathematics with Applications, Dec. 2003, 14 pages, vol. 46, Issue 12, Elsevier Ltd.

Mandelbaum, Amit et al., "Distance-based Confidence Score for Neural Network Classifiers," Sep. 28, 2017, 10 pages, arXiv:1709.09844v1, Computer Research Repository (CoRR), Cornell University, Ithaca, NY, USA.

Shalev-Shwartz, Shai, et al., "Minimizing the Maximal Loss: How and Why," Proceedings of the 33rd International Conference on Machine Learning, Jun. 19-24, 2016, 13 pages, JMLR, New York, NY, USA.

Srivastava, Nitish, et al., "Dropout: A Simple Way to Prevent Neural Networks from Overfitting," Journal of Machine Learning Research, Jun. 2014, 30 pages, vol. 15, JMLR.org.

Sze, Vivienne, et al., "Efficient Processing of Deep Neural Networks: A Tutorial and Survey," Aug. 13, 2017, 32 pages, arXiv:1703.09039v2, Computer Research Repository (CoRR)—Cornell University, Ithaca, NY, USA.

\* cited by examiner

NEURAL NETWORK LOSS FUNCTION THAT INCORPORATES INCORRECT CATEGORY PROBABILITIES

BACKGROUND

Machine learning automates the creation, based on historical data, of models that can then be used to make predictions. A class of models called deep neural networks (or DNNs) has become popular over the last few years, and there is now a menagerie of types of DNNs. Some examples of DNNs include feed-forward, convolutional, recurrent, long-short term memory (LSTM), and Neural Turing Machines (NTM).

Neural networks typically involve many (e.g., thousands, millions, or even potentially billions) of weights that are calculated during training and then used when the neural network is embedded into a device. Training these networks can be very costly, and thus techniques to improve training are useful.

BRIEF SUMMARY

Some embodiments of the invention improve training of a classification machine-trained network (e.g., a neural network) by incorporating probabilities computed for an input to belong to each of multiple categories (including incorrect categories) into the loss function used to train the network. Many training systems use a cross-entropy loss function term that is based only on the probability output by the network for a given input's actual category but is not affected by the distribution of output probabilities for the other (i.e., incorrect) categories. However, a network that evenly distributes the probabilities for the incorrect categories as opposed to outputting a relatively high probability for one of the incorrect categories is less susceptible to outputting a highest probability for an incorrect category due to minor perturbations. As such, some embodiments use loss function terms that seek to evenly distribute the probabilities for the incorrect categories given a particular probability for the correct category (while still including terms that seek to maximize the probability for the correct category).

Classification networks, in some embodiments, attempt to categorize inputs into one or more categories. One-hot classification networks are a specific type of network that classify each input into a single one of a set of possible categories. For a particular input, the output of such a network (at least after normalization) is a probability distribution that assigns a probability to each of the possible categories. For a well-trained network, the probability distribution for each input should assign the highest probability to the actual correct category for that input.

These classification networks (like many other types of neural networks) include many trainable parameters (e.g., hundreds of thousands or even millions). These parameters include weights, biases, and other parameters used to compute activations within the network. A common technique for training the parameters is to propagate a batch of inputs through the network to generate an output probability distribution for each input, use these output probability distributions to compute the value of a loss function, backpropagate the computed loss function through the network to determine gradients for each of the parameters (rates of change of the loss function with respect to each of the parameters), and use these gradients to adjust the parameters.

For classification networks, as mentioned, a common loss function is the cross-entropy loss. However, this cross-entropy loss uses a logarithm of the output probabilities of each input's correct category (such that a value of 1 for this output probability means there is no loss). However, as noted, the distribution of the output probabilities for the incorrect categories should be taken into account as well in some embodiments. For instance, for a given input to a network with three possible output categories, if the correct category output probability is 0.51, it is more optimal if the incorrect categories have output probabilities of 0.24 and 0.25 than 0.48 and 0.01. In the former case, the network will be far less likely to generate an incorrect answer due to small changes in the input (or the parameters) than in the latter case.

Thus, some embodiments use loss function terms that account for the output probabilities of incorrect categories. In some embodiments, these loss function terms decrease as the probabilities for the incorrect categories become more evenly distributed. For instance, some embodiments use differentiable functions that approximate maximum and minimum values of a function of the output probabilities for incorrect categories. Different embodiments use different differentiable functions so long as these functions increase as the largest incorrect output probability becomes larger and the smallest incorrect output probability becomes smaller. These loss function terms generally seek to evenly distribute the probabilities for the incorrect categories given a particular probability for the correct category. It should still be noted that the loss function still includes terms (e.g., cross-entropy) that seek to maximize the output probability for the correct category for each input.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawings, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purpose of explanation, several embodiments of the invention are set forth in the following figures.

DETAILED DESCRIPTION

Some embodiments of the invention improve training of a classification machine-trained network (e.g., a neural network) by incorporating probabilities computed for an input to belong to each of multiple categories (including incorrect categories) into the loss function used to train the network. Many training systems use a cross-entropy loss function term that is based only on the probability output by the network for a given input's actual category but is not affected by the distribution of output probabilities for the other (i.e., incorrect) categories. However, a network that evenly distributes the probabilities for the incorrect categories as opposed to outputting a relatively high probability for one of the incorrect categories is less susceptible to outputting a highest probability for an incorrect category due to minor perturbations. As such, some embodiments use loss function terms that seek to evenly distribute the probabilities for the incorrect categories given a particular probability for the correct category (while still including terms that seek to maximize the probability for the correct category).

Figure 1:
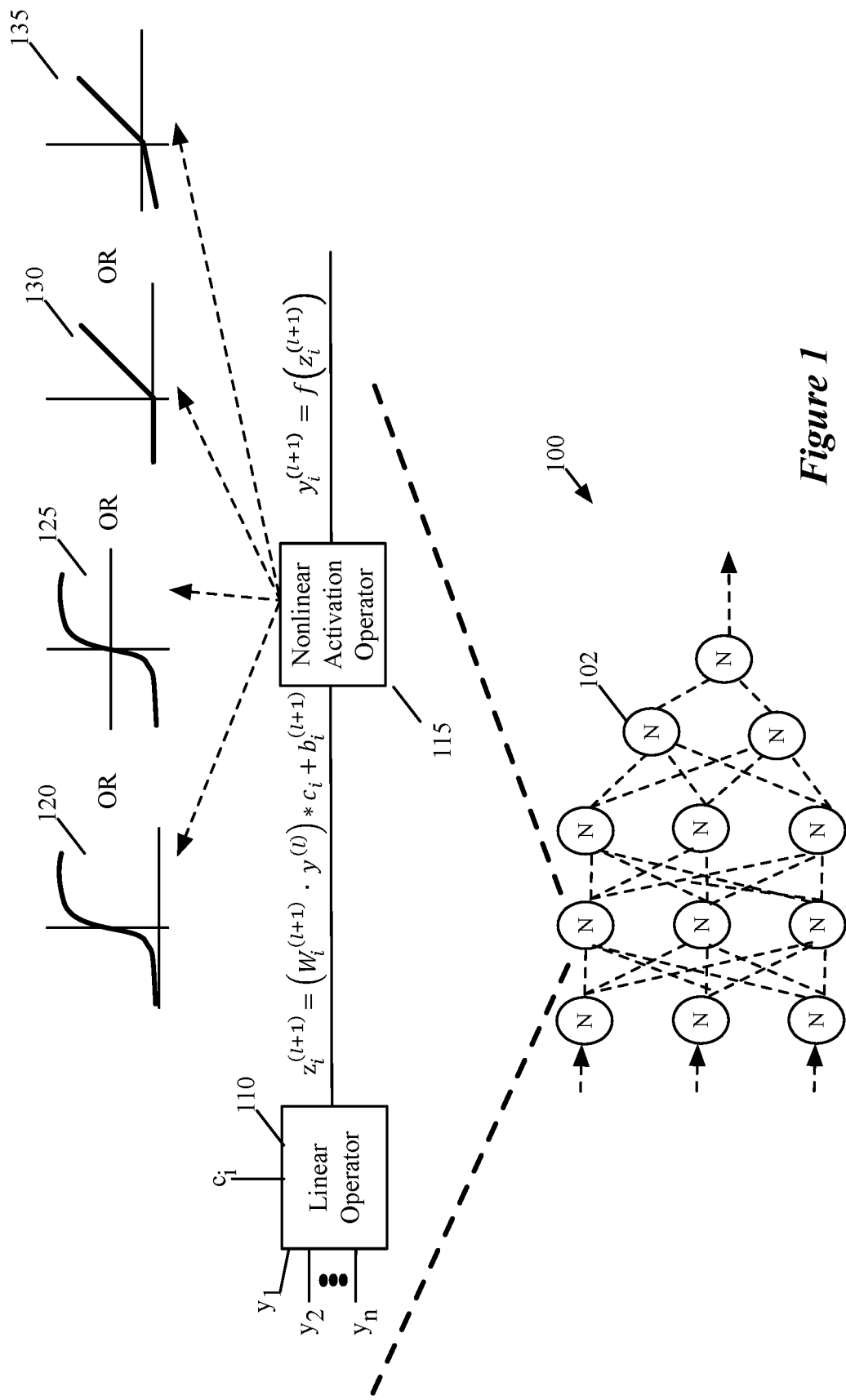
FIG. 1 illustrates an example of a multi-layer machine-trained network of some embodiments.

FIG. 1 illustrates an example of a multi-layer machine-trained network of some embodiments. This figure illustrates a feed-forward neural network 100 that has multiple layers of processing nodes 102 (also called neurons). In all but the first (input) and last (output) layer, each node 102 receives two or more outputs of nodes from earlier processing node layers and provides its output to one or more nodes in subsequent layers. The output of the node (or nodes) in the last layer represents the output of the network 100. In different embodiments, the output of the network 100 is a number in a range of values (e.g., 0 to 1), a vector representing a point in an N-dimensional space (e.g., a 128-dimensional vector), a probability distribution across a set of categories (e.g., assigning probabilities for the input belonging to each of the categories), or a value representing one of such a set of categories (e.g., for a network that classifies each input into one of eight possible outputs, the output could be a three-bit value).

In this example, the neural network 100 only has one output node. Other neural networks of other embodiments have several output nodes that provide more than one output value. Furthermore, while the network 100 includes only a few nodes 102 per layer, a typical neural network may include a varying number of nodes per layer (with some layers having several thousand nodes) and significantly more layers than shown (e.g., several dozen layers). In addition, the neural networks of other embodiments may be types of networks other than feed forward networks (e.g., recurrent networks, regulatory feedback networks, radial basis function networks, etc.).

The illustrated network 100 is a fully-connected network in which each node in a particular layer receives as inputs all of the outputs from the previous layer. However, the neural networks of some embodiments are convolutional feed-forward neural networks. In this case, the intermediate layers (referred to as "hidden" layers) may include convolutional layers, pooling layers, element-wise operation layers, fully-connected layers, and/or normalization layers. The convolutional layers of some embodiments use a small kernel (e.g., 2×2, 3×3, 5×5, etc.) to process blocks of input values (output values from a previous layer) in a set of two-dimensional grids (e.g., channels of pixels of an image, input feature maps) with the same set of parameters. The kernels (also referred to as filters) are three-dimensional, and multiple kernels are used to process each group of input values in a layer (resulting in a set of three-dimensional output grids, also referred to as output feature maps). Pooling layers combine clusters of outputs from one layer into a single node at the next layer, as part of the process of reducing an image (which may have a large number of pixels) or other input item down to a smaller size (e.g., a vector output). In some embodiments, pooling layers can use max pooling (in which the maximum value among the clusters of node outputs is selected) or average pooling (in which the clusters of node outputs are averaged).

Figure 2:
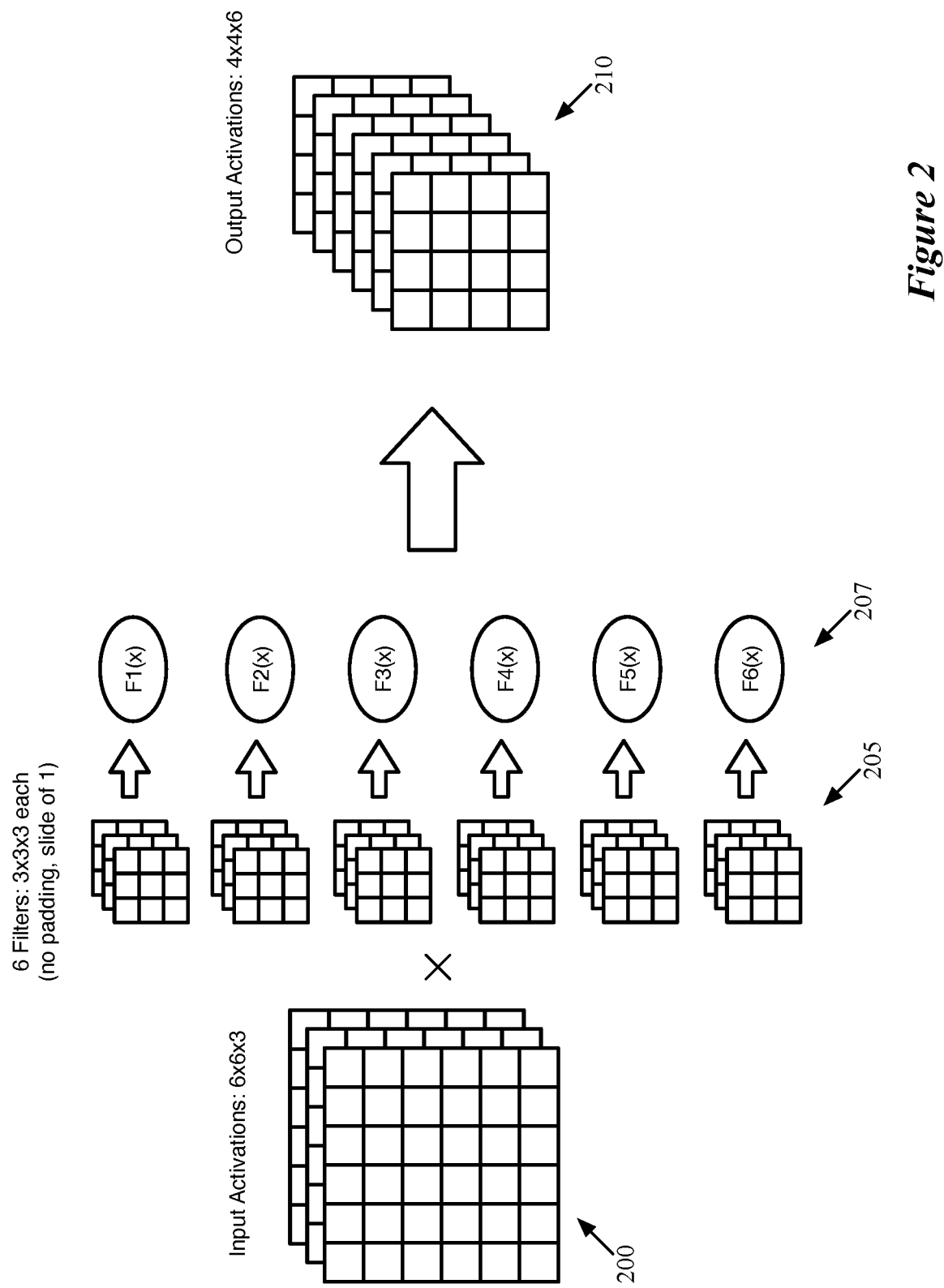
FIG. 2 conceptually illustrates a representation of a convolutional layer of a convolutional neural network.

FIG. 2 conceptually illustrates a representation of a convolutional layer of a convolutional neural network. The convolutional layer receives a set of input activation values 200 organized as a three-dimensional array. This three-dimensional array is typically either (i) a set of input values for the network, if the convolutional layer is the first layer of the network, or (ii) a set of output values of a previous layer of the network (e.g., a previous convolutional layer, a pooling layer, etc.). The array can be conceptualized as a set of two-dimensional grids, also referred to as input feature maps or input channels for the layer, as shown in the figure. In this example, the dimensions of the input values are 6×6×3 (i.e., three 6×6 input channels). For instance, convolutional neural networks are commonly used for image analysis (e.g., categorizing objects represented in the images), with the inputs to the network being the grids of color values assigned to the pixels of the image.

Each computation node of the convolutional layer involves a linear component (e.g., a dot product followed by scaling and bias functions) as well as a non-linear component, as further described below. The input to each computation node is a subset of the input activation values, and the dot product for the computation node involves multiplying those input activation values by the weights that make up one of the filters of the layer. As shown, in this example the layer includes six filters 205, each of which is 3×3×3. Each value in one of the filters is a weight value that is trained using the techniques described herein. Thus, in the example shown in this figure, each filter includes 27 trainable weight values.

The size of the filters in the x and y directions can vary (3×3 and 5×5 are common sizes), but in some embodiments the depth is required to match the depth of the input activations (in this case there are three input feature maps, or channels, so the depth of the filters is three). The number of filters in a given layer can also vary; in general, each filter is attempting to identify the presence or extent of a particular feature in the input values. For instance, in image analysis, a filter in an early layer might test for the presence of an edge in a particular direction while a filter in a later layer tests for the presence of a more specific feature type in the image (e.g., a nose).

To generate the output activations, each of the filters 205 is applied to numerous subsets of the input activation values 200. Specifically, in a typical convolution layer, each 3×3×3 filter is moved across the three-dimensional array of activation values, and the dot product between the 27 activations in the current subset and the 27 weight values in the filter is computed. This process starts in the top left corner (e.g., x=0-2, y=0-2) of the grid, and includes the full depth of the array. The filter moves across the rows, in this case using a slide of 1 (i.e., moving one column per computation node, such that the second dot product uses activations at x=1-3, y=0-2). When the end of a row is reached, the filter is moved back to the first columns (i.e., x=0-2) and down one row (i.e., y=1-3), and so on until the bottom right corner of the array is reached. Though not the case in this example, some embodiments use zero-padding at the edges of the grids (e.g., to allow for better detection of features at the edges of images).

Each computation node, in some embodiments, involves this dot product as well as the subsequent operations to generate the output activation values. The linear component includes any scale and/or bias calculations, and the non-linear component involves applying an activation function to the output of the linear component. As shown in the figure, each filter 205 has an associated activation function 207. In some embodiments, the activation function associated with a particular filter is the function applied to the output of the linear component of each computation node that uses that particular filter. Different embodiments may use the same activation function for all filters of a layer (and therefore all nodes in the layer) or have different activation functions associated with different filters (e.g., different types of activation functions or activation functions of the same type but with different parameters). The parameters of these activation functions 207 are also trained like the weight parameters in some embodiments.

The output activation values 210 are arranged in a 4×4×6 array in this example. The outputs from a single filter are arranged in a single grid (also referred to as an output feature map or output channel), and because the example has six filters 205, the output activations have six output feature maps. Using a slide value of 1 with no zero-padding results in a 4×4 output feature map for each filter. These output activation values 210 are then the input activation values for the next layer of the neural network.

As shown in FIG. 1, each node in the neural network 100 has a linear component 110 and a nonlinear component 115. The linear component 110 of each hidden or output node in this example computes a dot product of a vector of weight coefficients and a vector of output values of prior nodes (i.e., as described above for convolutional layers), multiplies this by a scaling value (which may be set to 1), and adds an offset. In other words, in a convolutional or fully-connected layer, a node's linear operator computes a scaled weighted sum of its inputs (which are outputs of the previous layer of nodes) plus an offset (also referred to as a bias). Similarly, the linear component 110 of each input node of some embodiments computes a dot product of a vector of weight coefficients and a vector of input values, scales this dot product, and adds an offset. In other embodiments, each input node receives a single input and passes that input as its output. Each node's nonlinear component 115 computes a function based on the output of the node's linear component 110. This function is commonly referred to as the activation function, and the outputs of the node (which are then used as inputs to the next layer of nodes) are referred to as activations.

The notation of FIG. 1 can be described as follows. Consider a neural network with L hidden layers (i.e., L layers that are not the input layer or the output layer). The variable/can be any of the hidden layers (i.e., $l \in \{1, \ldots, L-1\}$ index the hidden layers of the network, with l=0 representing the input layer and l=L representing the output layer). The variable $z_i^{(l+1)}$ represents the output of the linear component 110 of a hidden node i in layer l+1. As indicated by the following Equation (1), the variable $z_i^{(l+1)}$ is computed as the dot product of a vector of weight values $W_i^{(l+1)}$ and a vector of outputs $y^{(l)}$ from layer/multiplied by a scaling value $c_i$, and offset by a bias value $b_i$:

$$z_i^{(l+1)} = \left(W_i^{(l+1)} \cdot y^{(l)}\right) * c_i + b_i^{(l+1)} = \sum_{k=1}^{n} \left(w_{ik}^{(l+1)} * y_k^{(l)}\right) * c_i + b_i^{(l+1)}. \quad (1)$$

The scaling value $c_i$ is a value to which all the weight values for the node are normalized. In some embodiments, the scaling value $c_i$ is 1. The symbol * is an element-wise product, while the symbol · is the dot product. The weight coefficients $W^{(l)}$ are parameters that are adjusted during the network's training in order to configure the network to solve a particular problem (e.g., object or face recognition in images, voice analysis in audio, depth analysis in images, etc.). In some embodiments, the training algorithm imposes certain constraints on the weight values. Specifically, some embodiments impose a ternary constraint that requires all of the weight values for any given layer to be either zero, a positive value, or a negation of the positive value (e.g., 0, 1, and −1). In addition, some embodiments require that at least a threshold percentage of the weight values (for a given layer or for the entire network) are equal to zero (e.g., 75%, 80%, etc.).

The output $y_i^{(l+1)}$ of the nonlinear component 115 of a node in layer l+1 is a function of the node's linear component, and can be expressed as by Equation (2) below:

$$y_i^{(l+1)} = f\left(z_i^{(l+1)}\right). \quad (2)$$

In this equation, $f$ is the nonlinear activation function for node i. Examples of such activation functions include a sigmoid function 120 ($f(x)=1/(1+e^{-x})$), a tan h function 125, a ReLU (rectified linear unit) function 130 or a leaky ReLU function 135, as shown.

Traditionally, the sigmoid function and the tan h function have been the activation functions of choice. More recently, the ReLU function ($f(x)=\max(0, x)$) has been proposed for the activation function in order to make it easier to compute the activation function. See Nair, Vinod and Hinton, Geoffrey E., "Rectified linear units improve restricted Boltzmann machines," ICML, pp. 807-814, 2010. Even more recently, the leaky ReLU has been proposed in order to simplify the training of the processing nodes by replacing the flat section (i.e., x<0) of the ReLU function with a section that has a slight slope. See He, Kaiming, Zhang, Xiangyu, Ren, Shaoqing, and Sun, Jian, "Delving deep into rectifiers: Surpassing human-level performance on imagenet classification," arXiv preprint arXiv: 1502.01852, 2015. In some embodiments, the activation functions can be other types of functions, like cup functions, periodic functions, piecewise linear functions, etc.

Equation (2) can be expressed in the following expanded format of Equation (3):

$$y_i^{(l+1)} = f\left(z_i^{(l+1)}\right) = f\left[\left(\sum_{k=1}^{n} w_{ik} * y_k\right) * c_i + b_i^{(l+1)}\right]. \quad (3)$$

In this equation, $w_{ik}$ are weight values associated with the inputs $y_k$ of the node i in layer l+1.

Before a multi-layer network (e.g., a convolutional neural network) can be used to solve a particular problem, the network is put through a supervised training process that adjusts the network's configurable parameters (e.g., the weight values, biases, etc.). The training process iteratively selects different input value sets with known output value sets. For each selected input value set, the training process typically (1) forward propagates the input value set through the network's nodes to produce a computed output value set and then (2) backpropagates a gradient (rate of change) of a loss function (output error) that quantifies in a particular way the difference between the input set's known output value set and the input set's computed output value set, in order to adjust the network's configurable parameters (e.g., the weight values).

In some embodiments, at the end of the training of the network, each of the weights is restricted to a set of allowed quantized weight values (e.g., the set {0,1,−1} or {0,$\alpha_k$,−$\alpha_k$}, where $\alpha_k$ is a scale value that varies for different layers or filters). In addition, in some embodiments, the training is further complicated in that the output values of each layer are quantized (e.g., to a particular number of bits). The combination of (i) weight quantization (e.g., ternarization), (ii) weight sparsity (ensuring that a threshold of the weight values are equal to zero), and (iii) output value quantization allows for the network to be implemented by a specialized neural network inference circuit of some embodiments that puts restrictions on the weight and intermediate layer output value sizes in the interest of power and memory savings. However, these features (weight and output value quantization) also make training the network more complicated in some embodiments. Other embodiments use floating-point networks (i.e., with floating point weight values and intermediate output values). The loss functions described herein are applicable to both floating-point and quantized networks.

Figure 3:
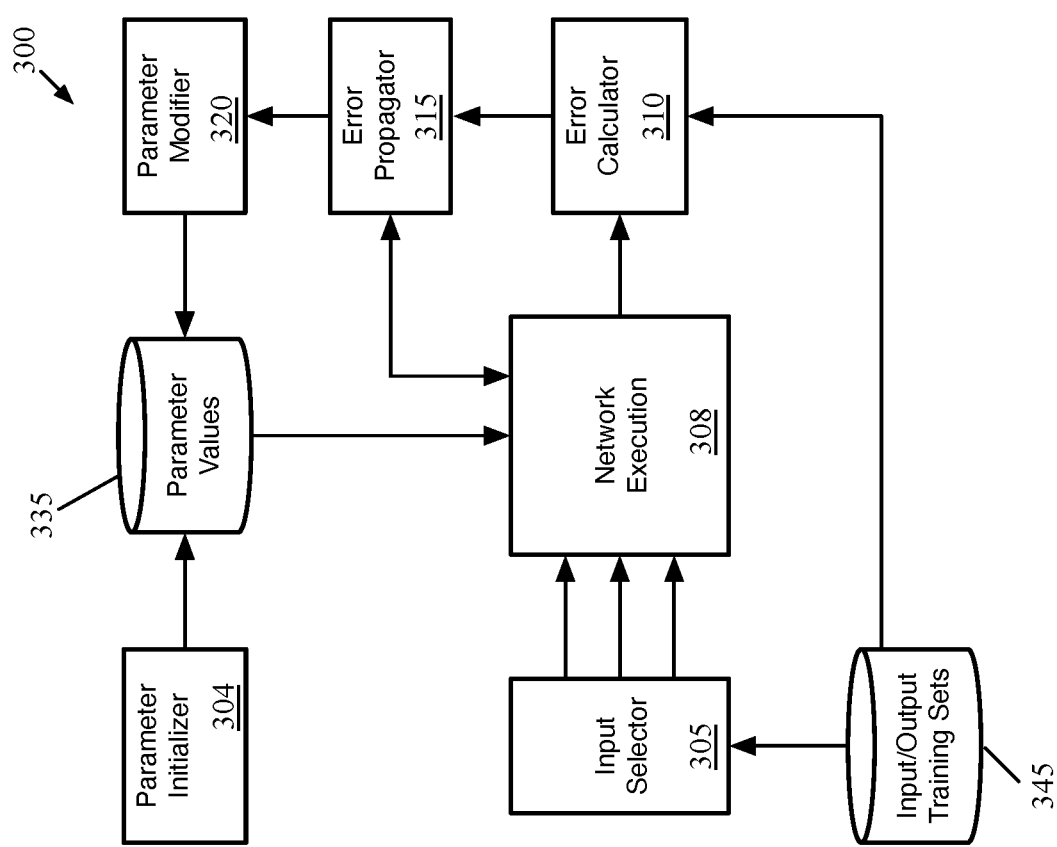
FIG. 3 conceptually illustrates a training system of some embodiments that trains the weight values (and other parameters) of a neural network.

FIG. 3 conceptually illustrates a training system 300 of some embodiments that trains the weight values (and other parameters) of a neural network. The training system 300 may train floating-point weight values, quantized weight values, and/or other types of parameters (e.g., biases, activation function parameters, etc.). The training system uses a loss function that accounts for both the output probability of the correct category for each input as well as the output probabilities of the incorrect categories for each input.

As shown, the training system 300 has a number of modules, including a parameter initializer 304, an input selector 305, a network execution module 308, an error calculator 310, an error propagator 315, and a parameter modifier 320, all of which will be described in further detail below. In some embodiments, all of these modules execute on a single device, such as a server, a desktop or laptop computer, a mobile device (e.g., a smartphone, tablet, etc.), a virtual machine, etc. In other embodiments, these modules may execute across multiple interconnected devices (or virtual machines, containers, etc.), or separate instances may execute on multiple devices (or virtual machines, containers, etc.) for additional computing power.

The parameter initializer 304 takes as input the network structure and generates initial (typically random) parameter values. In some embodiments, the neural network weights are floating-point weight values restricted to values ranging from −1 to 1, while other embodiments do not restrict the weight values at all. The initial weight values and other parameters (e.g., biases) are stored in a parameter storage 335. In some embodiments, the parameter storage 335 stores the most recent set of trained parameters, which change throughout training. Other embodiments store a history of the sets of parameter values for the network, which allows review of how parameters may have changed throughout the training.

The network execution module 308 of some embodiments handles the actual execution of the network (forward propagation of an input) during training. It should be noted that while many training systems use stochastic gradient descent (SGD) training, many of the principles described herein regarding input selection are not limited to SGD training. The network execution module 308 applies the network structure using the current stored parameters 335 to a set of inputs in order to propagate these inputs through the network and generate corresponding outputs.

During forward propagation, the input selector 305 selects which inputs from the input/output sets 345 to propagate together through the network for a batch of inputs in a single training iteration (often referred to as a minibatch). The input selector 305, in some embodiments, selects the inputs for a batch based on various factors (e.g., scores calculated for each of the inputs that are indicative of a relative difficulty the network is having handling that input). In some embodiments, the input selector 305 also prepares these inputs for propagation through the network so that the network execution module 308 can generate output values for the inputs.

The input/output sets 345 include various inputs to the network as well as the corresponding expected (ground truth) outputs for each of the inputs. Some embodiments perform training with a large number of different inputs, as this can help train the weight values for an average input. Each input in an input set may be an image, a voice or other audio snippet, etc. that is to be propagated through the network, depending on the specific purpose for which the network is being trained. For example, if a network is being trained to classify images into a specified set of categories, then the set of inputs will include numerous images for each of the categories, typically including various types of edge cases (e.g., images where the object is distorted or only partially visible, examples of objects in a first category that appear similar to objects of a second category, etc.). Similarly, a network could be trained to perform acoustic scene classification of audio snippets (specifying in which of a predefined set of acoustic scenes an audio snippet was recorded) or voice classification (specifying which of a predefined set of people is speaking in an audio snippet), in which case the set of inputs will include numerous audio snippets for each of the categories. Each input also has a corresponding expected (ground truth) output that is what the network should generate as its output when presented with that input. For a classification network, this ground truth output specifies the correct category for each input.

The error calculator 310 compares the generated output values to expected (ground truth) output values using a loss function, which also may incorporate various regularization terms, Lagrangian terms, etc. that bias the training in certain ways. For classification networks, as mentioned, a common loss function is the cross-entropy loss. However, this cross-entropy loss uses a logarithm of the output probabilities of each input's correct category (such that a value of 1 for this output probability means there is no loss). However, as noted, the distribution of the output probabilities for the incorrect categories should be taken into account as well in some embodiments. For instance, for a given input to a network with three possible output categories, if the correct category output probability is 0.51, it is more optimal if the incorrect categories have output probabilities of 0.24 and 0.25 than 0.48 and 0.01. In the former case, the network will be far less likely to generate an incorrect answer due to small changes in the input (or the parameters) than in the latter case.

Thus, some embodiments use loss function terms that account for the output probabilities of incorrect categories. In some embodiments, these loss function terms decrease as the probabilities for the incorrect categories become more evenly distributed. For instance, some embodiments use differentiable functions that approximate maximum and minimum values of a function of the output probabilities for incorrect categories. Different embodiments use different differentiable functions so long as these functions increase as the largest incorrect output probability becomes larger and the smallest incorrect output probability becomes smaller. These loss function terms generally seek to evenly distribute the probabilities for the incorrect categories given a particular probability for the correct category. It should still be noted that the loss function still includes terms (e.g., cross-entropy) that seek to maximize the output probability for the correct category for each input.

The following provides examples of such a loss function. In this example, the loss function includes multiple terms (or a subset of these terms):

$$\mathcal{L} \stackrel{\text{def}}{=} ce\_loss + cce\_loss + lodds\_loss + Lodds\_big\_loss + Lodds\_small\_loss + \ln\_Z\_loss \quad (4)$$

These terms are defined as follows (it should be noted that "log" is used herein to mean any logarithm, including the natural logarithm). The first term is simply the standard cross-entropy loss:

$$ce\_loss = ce\_coeff(\log(p_c)) \quad (5)$$

The second term is a complementary cross-entropy loss that is symmetrical to the cross-entropy loss and works as a complement to the cross-entropy loss:

$$cce\_loss = cce\_coeff(\log(1-p_c)) \quad (6)$$

Both of these terms depend only on $p_c$, the output probability for the correct category, as well as their respective coefficients (ce_coeff and cce_coeff). For instance, the typical coefficient for cross-entropy loss on its own is −1.

The next term is a combination of the cross-entropy and complementary cross-entropy losses:

$$lodds\_loss = p\_corr\_lodds(lodds(p_c)), \quad (7)$$

where the lodds function is defined by:

$$lodds(x_i) \stackrel{\text{def}}{=} \log\left(\frac{x_i + \epsilon}{1 - x_i + \epsilon}\right) \quad (8)$$

This term has the property of having a (nearly) constant gradient, thereby enabling the loss function to put a constant pressure on the network changes to improve the probability for the correct class ($p_c$) throughout training of the network. In this equation, the $x_i$ are raw network outputs, prior to being converted into probabilities (e.g., using a softmax function). These raw network outputs, unlike the probabilities $p_i$, may be values greater than 1, negative values, etc., in some embodiments.

The subsequent two terms incorporate the probabilities for the incorrect classes. These terms are differentiable functions that approximate the maximum and minimum values of lodds($p_j$), where $p_j$ are the probabilities of the incorrect categories j for each input:

$$Lodds\_big\_loss = c_{big}\left(\sum_j (lodds(p_j))^{a_{big}}\right)^{b_{big}} \quad (9)$$

and $$Lodds\_small\_loss = c_{small}\left(\sum_j (lodds(p_j))^{a_{small}}\right)^{b_{small}}. \quad (10)$$

Here, $C_{big}$, $a_{big}$, $b_{big}$, $C_{small}$, $a_{small}$, and $b_{small}$ are coefficients set by, e.g., a user that is managing the training of the network. These loss function terms single out the highest and lowest incorrect category probabilities and attempt to push these down (in the case of the highest probability) or up (in the case of the lowest probability). As noted, it is important to also use cross-entropy or the lodds function of the correct category probability in the loss function so that there is also a term that pushes to increase the correct category probability.

It should be noted that some embodiments use log-sum-exponent functions to approximate the maximum and minimum values instead of these two functions shown above:

$$LSE\_big\_loss = \frac{c_{big}}{\lambda_{big}}\log\left(\sum_j \exp(\lambda_{big} lodds(p_j))\right) \quad (11)$$

and $$LSE\_small\_loss = \frac{c_{small}}{\lambda_{small}}\log\left(\sum_j \exp(\lambda_{small} lodds(p_j))\right). \quad (12)$$

Finally, some embodiments include a regularizing term that pushes for all of the probabilities of the incorrect categories to be evenly distributed. This term is a summation of the reciprocals of the incorrect probabilities:

$$Z = \sum_j \frac{1}{p_j}. \quad (13)$$

These different terms can be increased or decreased in importance based on the choice of the different coefficients ce_coeff, cce_coeff, p_corr_lodds, $c_{big}$, $c_{small}$, and lnz_coeff. For instance, some embodiments set the cross-entropy and complementary cross-entropy coefficients to 0 and instead just use the lodds function of the correct category probability (e.g., with a coefficient of −1). Similarly, the $c_{big}$ and $c_{small}$ can be set to 1 (or −1) with the lnz_coeff set to 0 in some embodiments in order to just use the maximum and minimum approximator functions for the incorrect category probabilities without the regularizing ln_Z_loss function (or vice versa).

It should be noted that, in the implementation of some embodiments, these above-described loss function terms are implemented in a manner so as to avoid overflows. For instance, the cross-entropy loss term (ce_loss) uses a numerically stable LogSoftmax function in some embodiments. The complementary cross-entropy may be implemented as follows:

$$\text{cce\_loss} = \text{cce\_coeff}(\log(1 - p_c)) = \text{cce\_coeff}\left(\log\left(\frac{\sum_i \exp x_i - \exp x_c}{\sum_i \exp x_i}\right)\right) \quad (14)$$

$$= \text{cce\_ceoff}\left(\log\left(-\exp x_c + \sum_i \exp x_i\right) - \log\left(\sum_i \exp x_i\right)\right) \quad (15)$$

$$= \text{cce\_coeff}(LSE(x_j) - LSE(x_i)). \quad (16)$$

As noted above, the $x_i$ are the raw network outputs (prior to conversion to probabilities). The $x_j$ are the raw network outputs for only the incorrect categories.

The lodds function can be computed as follows in some embodiments:

$$lodds(p_i) \stackrel{def}{=} \log\left(\frac{p_i}{1 - p_i}\right) = \log\left(\frac{\exp(x_i)}{-\exp(x_i) + \sum_k \exp(x_k)}\right) \quad (17)$$

$$= \log(\exp(x_i)) - \log\left(-\exp(x_i) + \sum_k \exp(x_k)\right) = x_i - LSE(x_{k \neq i}). \quad (18)$$

Here, the subscript k, like the subscript i, denotes all of the network outputs (both correct and incorrect). Finally, the Ln_Z function may be computed as follows in some embodiments:

$$\log(Z) = \log\left(\sum_j \frac{1}{p_j}\right) = \log\left(\sum_j \left(\frac{\sum_i \exp x_i}{\exp x_j}\right)\right) = \log\left(\sum_i \exp x_i \sum_j \left(\frac{1}{\exp x_j}\right)\right) \quad (19)$$

$$= LSE(x_i) + LSE(-x_j). \quad (20)$$

Returning to the modules shown in FIG. 3, the error propagator 315 back-propagates the computed error for a batch of inputs to determine the rate of change (gradient) of the loss function with respect to a change in each of the network parameters being trained at the current value of the loss function. The parameter modifier 320 uses these network parameter gradients to modify the parameter values 335 for the next training iteration. Some embodiments use SGD training to modify the parameter values. The process of input selection, forward propagation, loss function calculation, and back-propagation is repeated for multiple batches of inputs 345 in some embodiments.

Figure 4:
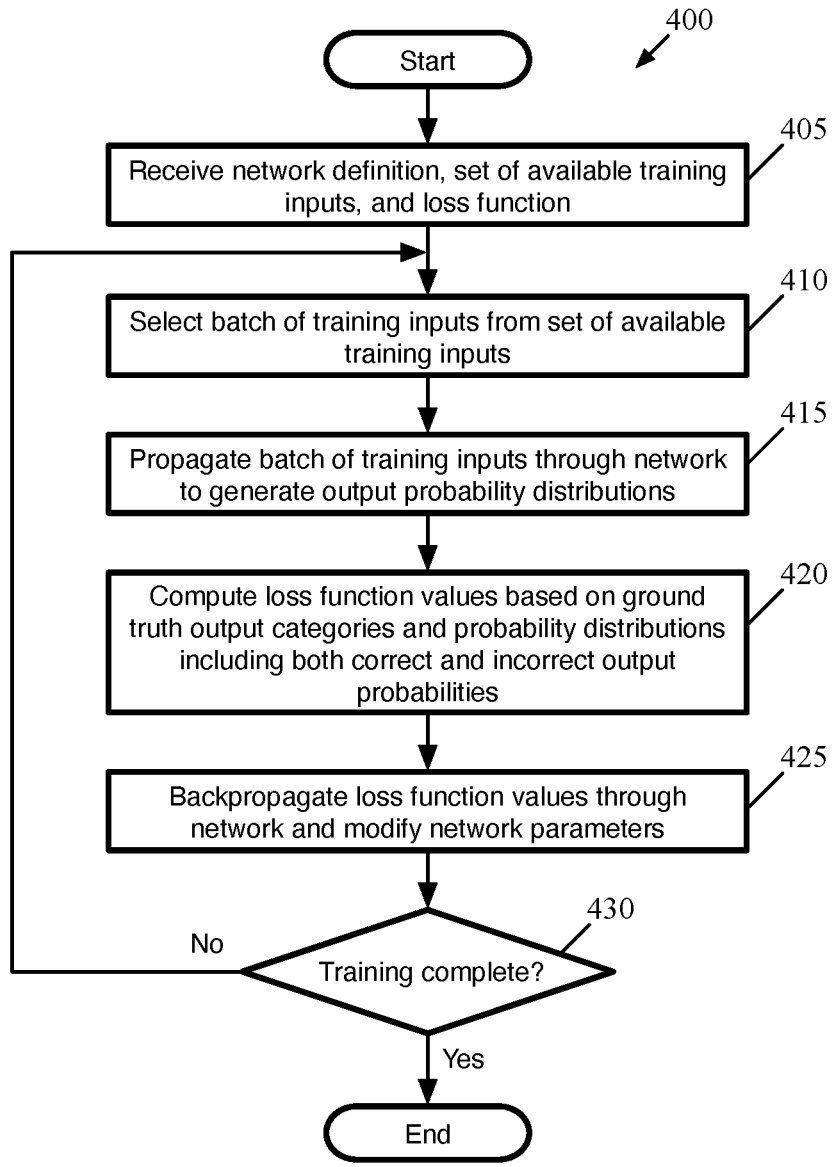
FIG. 4 conceptually illustrates a process of some embodiments for training a classification network using a loss function that accounts for both the output probability of the correct category for each input as well as the output probabilities of the incorrect categories for each input.

FIG. 4 conceptually illustrates a process 400 of some embodiments for training a classification network using a loss function that accounts for both the output probability of the correct category for each input as well as the output probabilities of the incorrect categories for each input. The process 400, in some embodiments, is performed by a network training (network optimization) application (e.g., the training system 300 shown in FIG. 3), which may be a program executing on a single device (e.g., a single laptop or desktop, a mobile device, a physical or virtual server, etc.) or a distributed application that operates on multiple machines (e.g., on multiple physical computers, multiple virtual machines or containers within a datacenter or multiple datacenters, etc.). In some embodiments, the process 400 is an amalgamation of several processes that can be performed by multiple different machines or groups of machines (e.g., a forward propagation process, an SGD training process, etc.).

As shown, the process 400 begins by receiving (at 405) a definition of a multi-layer network (e.g., a neural network), a set of available training inputs, and a loss function. The network of some embodiments is a classification network made up of numerous computation nodes, organized in layers, that produce output values based on one or more input values. This network structure includes the type of each layer (e.g., convolutional, element-wise addition or multiplication, pooling, fully-connected, etc.), as well as the structure of the input and output of the layer. For convolutional layers, the input structure is typically defined by the output of the previous layer, while the output structure (for a given input structure) is defined based on the number of filters, the kernel size of those filters, and how that filter is applied (padding, x/y stride). In some embodiments, the parameters (e.g., weight values, bias values, etc.) of the network are initialized as well (e.g., assigned random values within a particular range).

As noted, the network is a classification network in some embodiments (e.g., a one-host classification network). That is, for each input, the network outputs a probability distribution across a set of categories. The probability distribution specifies, for each category, a likelihood that the input is a member of that category. Thus, the set of available training inputs includes a set of inputs each of which is a member of a specified category. For a one-hot network, the ground truth probability distribution indicates a correct category (an ideal probability of 1) and a set of incorrect categories (with ideal probabilities of 0). The loss function, as described in more detail below, accounts for both the output probability of the correct category for each input as well as the output probabilities of the incorrect categories for each input.

Depending on the goal of the classification network, these training inputs can be different types of inputs. For instance, many classification networks classify objects represented in images, so the training inputs are images. Other types of inputs include audio input (e.g., voice inputs, music snippets, audio recordings, etc.), video streams, etc. Different networks may classify audio inputs based on voice categories, musical categories, spoken language, acoustic scene, etc.

Next, the process 400 selects (at 410) a batch of training inputs from the set of available training inputs. As noted above, some embodiments perform training in iterations of minibatches, in which a subset of the available inputs are used (e.g., 8 inputs, 20 inputs, 100 inputs, etc.). Some embodiments select the inputs randomly, while other inputs use various weighting techniques to choose the inputs for a particular batch (e.g., by assigning weights to the inputs based on various factors).

The process 400 propagates (at 415) the batch of training inputs through the network to generate output probability distributions. For each input, a classification network of some embodiments outputs a probability distribution for each input that provides probabilities that the input belongs to each potential category. In some embodiments, the network outputs raw (logit) values for each potential category, which are then converted into probabilities (e.g., using a softmax function).

Figure 5:
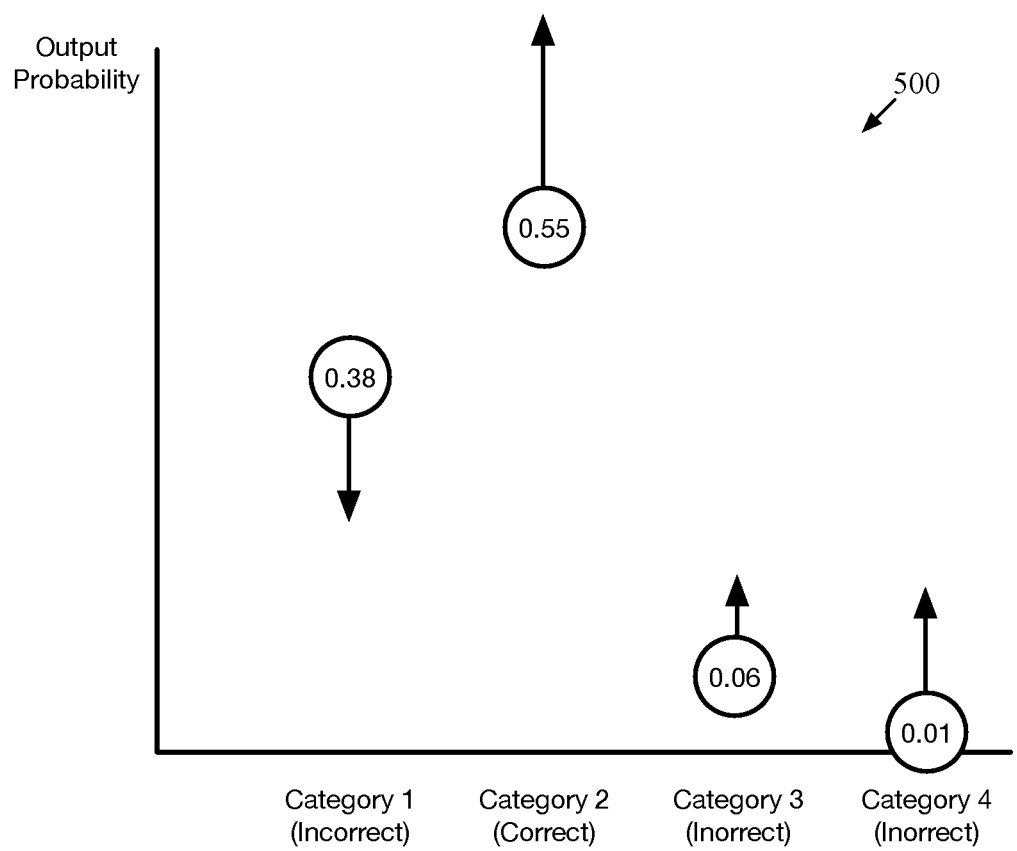
FIG. 5 conceptually illustrates a set of output probabilities for a network that classifies inputs into four categories.

FIG. 5 conceptually illustrates a set of output probabilities 500 (after normalization) for a network that classifies inputs into four categories. In this case, the correct category (category 2) is assigned an output probability of 0.55 while the incorrect categories (categories 1, 3, and 4) are assigned output probabilities of 0.38, 0.06, and 0.01 respectively. Thus, the network outputs the correct answer (category 2 having the highest probability). However, a more optimal network would (i) output a higher probability for the correct category and/or (ii) output a more even distribution of probabilities between the three incorrect categories. It is not optimal to have one of the incorrect category probabilities (0.38) close to the correct category probability (0.55).

Next, the process 400 computes (at 420) loss function values based on the ground truth output categories and the probability distributions, using both the correct and incorrect output probabilities. In some embodiments, the loss function is a combination of the terms described above in equations (4)-(13). As described, such a loss function penalizes (i) low output probabilities for the correct category for a particular input and (ii) divergence from even distribution of the probabilities for the incorrect categories.

Finally, the process 400 backpropagates (at 425) these loss function values through the network to modify the network parameters. The backpropagation operation calculates a gradient for each parameter to identify the direction and relative amount by which the parameter should be modified to achieve more optimal results for the training inputs. These gradients are then used to modify the parameters (e.g., based on a learning rate hyperparameter that specifies how quickly each parameter should be modified). The objective is to push the parameters towards values that collectively minimize the loss function. That is, the network parameters are pushed in such a way as to push the output probability distributions toward more optimal results. FIG. 5 shows (via arrows) that the parameters are modified so as to push the correct category output probability upward, while pushing the incorrect category probabilities towards a more even distribution. That is, the parameters are modified so as to push the first incorrect category output probability downward while pushing the other incorrect category output probabilities upward (by different amounts).

With the current batch complete (i.e., forward propagation and back-propagation finished for the batch), the process 400 determines (at 430) whether the current training is complete. In some embodiments, the operations 410-425 are performed multiple times for a given training epoch, after which either the network is trained or various other operations may be performed (e.g., adjustment of hyperparameters, modification of input selection weights, etc.). If the training is complete, the process 400 ends.

Once trained, the networks of some embodiments can be compiled into a set of program instructions for a machine-trained network inference circuit that implements such networks using real-world inputs. Such a machine-trained network inference circuit of some embodiments can be embedded into various different types of devices in order to perform different purposes (e.g., face recognition, object categorization, voice analysis, etc.). For each type of device, a network is trained, and the network parameters are stored with the neural network inference circuit to be executed on the device. These devices can include mobile devices, desktop computers, Internet of Things (IoT devices), etc.

Figure 6:
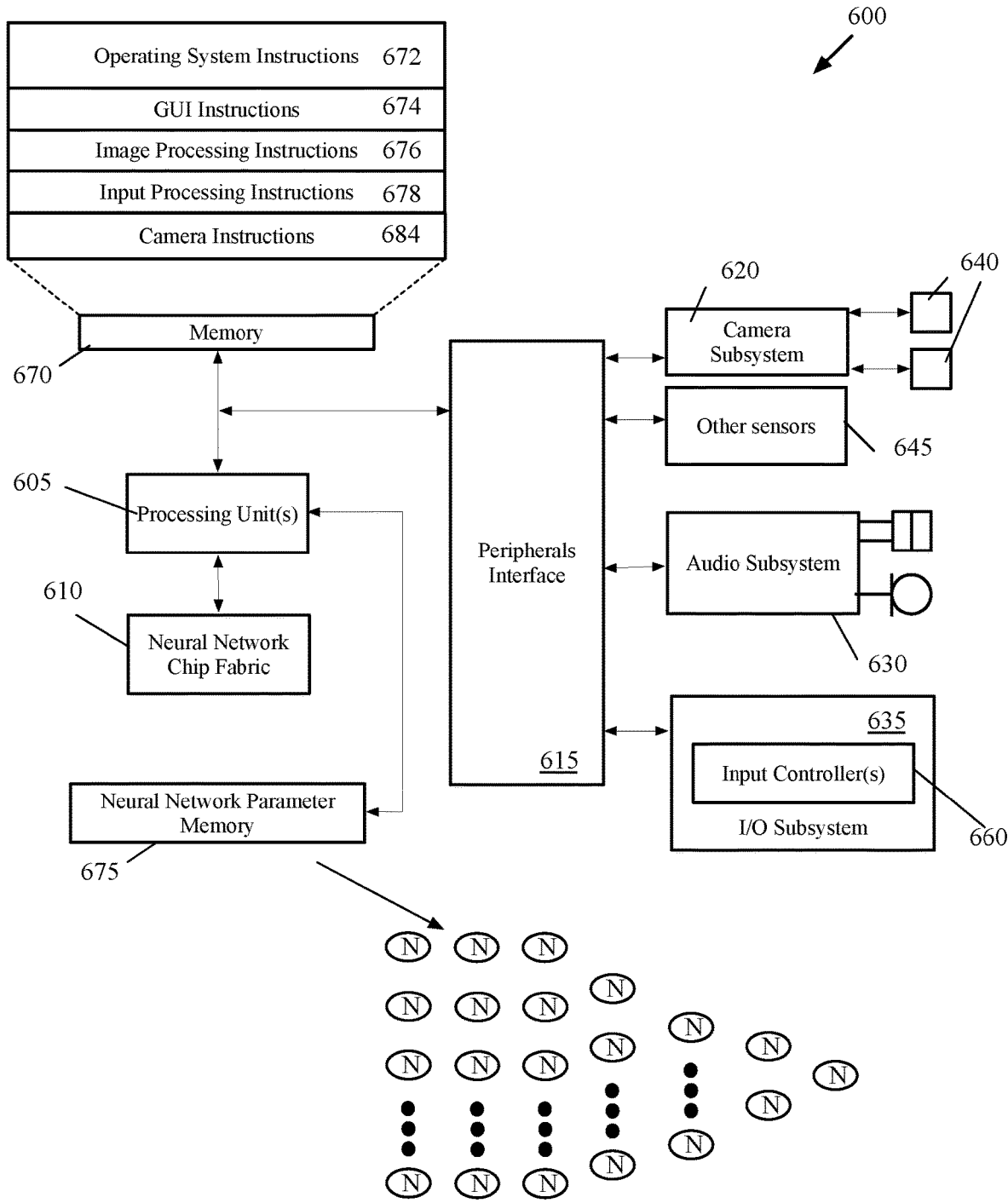
FIG. 6 illustrates an example of the architecture of a computing device that stores neural network processing instructions.

FIG. 6 is an example of an architecture 600 of an electronic device that includes a neural network integrated circuit of some embodiments. The electronic device may be a mobile computing device such as a smartphone, tablet, laptop, etc., or may be another type of device (e.g., an IoT device, a personal home assistant). As shown, the device 600 includes one or more general-purpose processing units 605, a neural network chip fabric 610, and a peripherals interface 615.

The peripherals interface 615 is coupled to various sensors and subsystems, including a camera subsystem 620, an audio subsystem 630, an I/O subsystem 635, and other sensors 645 (e.g., motion/acceleration sensors), etc. The peripherals interface 615 enables communication between the processing units 605 and various peripherals. For example, an orientation sensor (e.g., a gyroscope) and an acceleration sensor (e.g., an accelerometer) can be coupled to the peripherals interface 615 to facilitate orientation and acceleration functions. The camera subsystem 620 is coupled to one or more optical sensors 640 (e.g., charged coupled device (CCD) optical sensors, complementary metal-oxide-semiconductor (CMOS) optical sensors, etc.). The camera subsystem 620 and the optical sensors 640 facilitate camera functions, such as image and/or video data capturing.

The audio subsystem 630 couples with a speaker to output audio (e.g., to output voice navigation instructions). Additionally, the audio subsystem 630 is coupled to a microphone to facilitate voice-enabled functions, such as voice recognition, digital recording, etc. The I/O subsystem 635 involves the transfer between input/output peripheral devices, such as a display, a touch screen, etc., and the data bus of the processing units 605 through the peripherals interface 615. The I/O subsystem 635 includes various input controllers 660 to facilitate the transfer between input/output peripheral devices and the data bus of the processing units 605. These input controllers 660 couple to various input/control devices, such as one or more buttons, a touchscreen, etc.

In some embodiments, the device includes a wireless communication subsystem (not shown in FIG. 6) to establish wireless communication functions. In some embodiments, the wireless communication subsystem includes radio frequency receivers and transmitters and/or optical receivers and transmitters. These receivers and transmitters of some embodiments are implemented to operate over one or more communication networks such as a GSM network, a Wi-Fi network, a Bluetooth network, etc.

As illustrated in FIG. 6, a memory 670 (or set of various physical storages) stores an operating system (OS) 672. The OS 672 includes instructions for handling basic system services and for performing hardware dependent tasks. The memory 670 also stores various sets of instructions, including (1) graphical user interface instructions 674 to facilitate graphic user interface processing; (2) image processing instructions 676 to facilitate image-related processing and functions; (3) input processing instructions 678 to facilitate input-related (e.g., touch input) processes and functions; and (4) camera instructions 684 to facilitate camera-related processes and functions. The processing units 605 execute the instructions stored in the memory 670 in some embodiments.

The memory 670 may represent multiple different storages available on the device 600. In some embodiments, the memory 670 includes volatile memory (e.g., high-speed random access memory), non-volatile memory (e.g., flash memory), a combination of volatile and non-volatile memory, and/or any other type of memory.

The instructions described above are merely exemplary and the memory 670 includes additional and/or other instructions in some embodiments. For instance, the memory for a smartphone may include phone instructions to facilitate phone-related processes and functions. An IoT device, for instance, might have fewer types of stored instructions (and fewer subsystems), to perform its specific purpose and have the ability to receive a single type of input that is evaluated with its neural network.

The above-identified instructions need not be implemented as separate software programs or modules. Various other functions of the device can be implemented in hardware and/or in software, including in one or more signal processing and/or application specific integrated circuits.

In addition, a neural network parameter memory 675 stores the weight values, bias parameters, etc. for implementing one or more machine-trained networks by the neural network chip fabric 610. In some embodiments, different clusters of the fabric 610 can implement different machine-trained networks in parallel in some embodiments. In different embodiments, these neural network parameters are stored on-chip (i.e., in memory that is part of the neural network chip fabric 610) or loaded onto the chip fabric 610 from the neural network parameter memory 675 via the processing unit(s) 605.

While the components illustrated in FIG. 6 are shown as separate components, one of ordinary skill in the art will recognize that two or more components may be integrated into one or more integrated circuits. In addition, two or more components may be coupled together by one or more communication buses or signal lines (e.g., a bus between the general-purpose processing units 605 and the neural network chip fabric 610, which enables the processing units 605 to provide inputs to the chip fabric 610 and receive the outputs of the network from the chip fabric 610. Also, while many of the functions have been described as being performed by one component, one of ordinary skill in the art will realize that the functions described with respect to FIG. 6 may be split into two or more separate components.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 7:
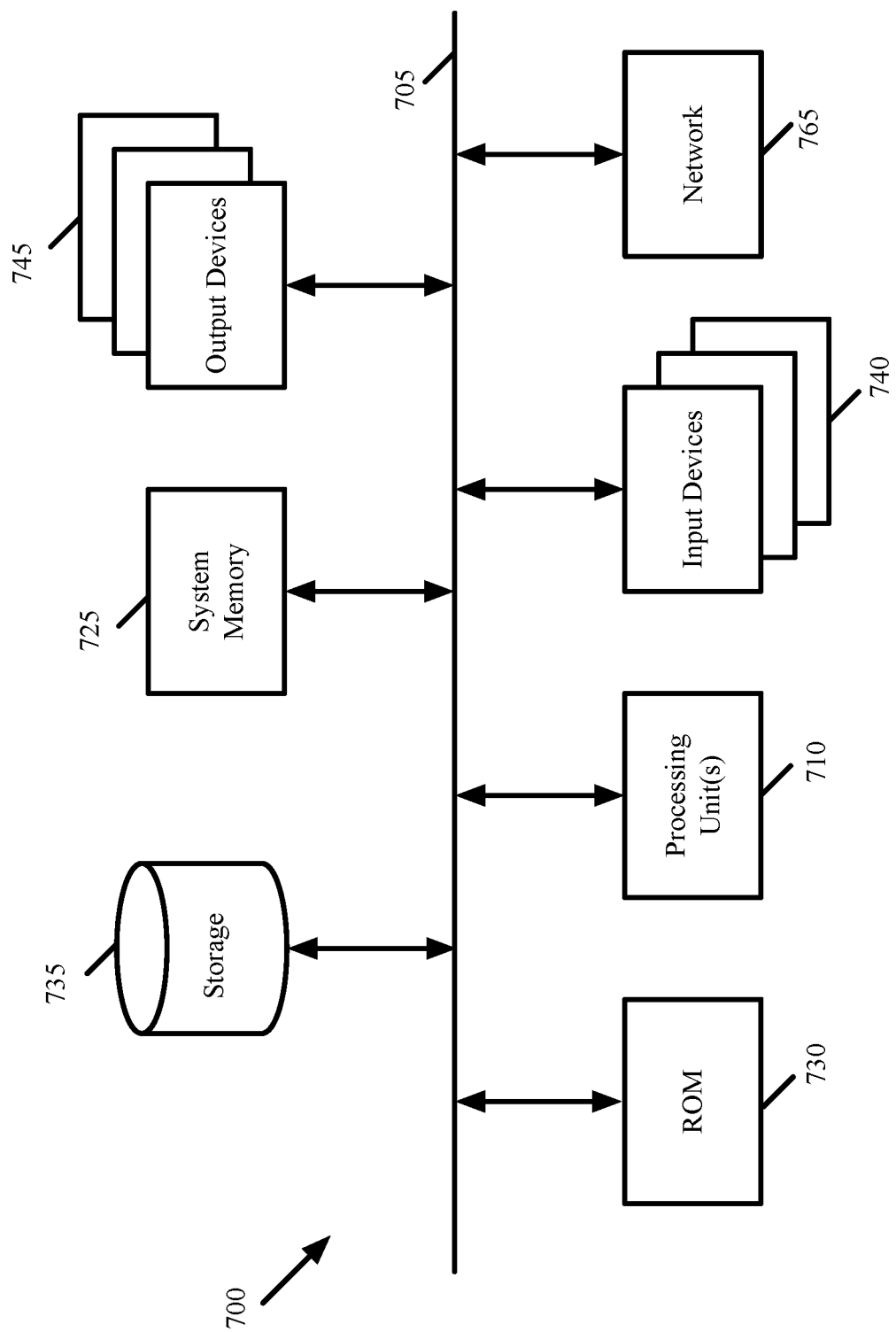
FIG. 7 conceptually illustrates an electronic system with which some embodiments of the invention are implemented.

FIG. 7 conceptually illustrates an electronic system 700 with which some embodiments of the invention are implemented. The electronic system 700 can be used to execute any of the applications (e.g., the training application) described above. The electronic system 700 may be a computer (e.g., a desktop computer, personal computer, tablet computer, server computer, mainframe, a blade computer etc.), phone, PDA, or any other sort of electronic device. Such an electronic system includes various types of computer readable media and interfaces for various other types of computer readable media. Electronic system 700 includes a bus 705, processing unit(s) 710, a system memory 725, a read-only memory 730, a permanent storage device 735, input devices 740, and output devices 745.

The bus 705 collectively represents all system, peripheral, and chipset buses that communicatively connect the numerous internal devices of the electronic system 700. For instance, the bus 705 communicatively connects the processing unit(s) 710 with the read-only memory 730, the system memory 725, and the permanent storage device 735.

From these various memory units, the processing unit(s) 710 retrieves instructions to execute and data to process in order to execute the processes of the invention. The processing unit(s) may be a single processor or a multi-core processor in different embodiments, and may include generic CPUs as well as graphics processing units (GPUs).

The read-only-memory (ROM) 730 stores static data and instructions that are needed by the processing unit(s) 710 and other modules of the electronic system. The permanent storage device 735, on the other hand, is a read-and-write memory device. This device is a non-volatile memory unit that stores instructions and data even when the electronic system 700 is off. Some embodiments of the invention use a mass-storage device (such as a magnetic or optical disk and its corresponding disk drive) as the permanent storage device 735.

Other embodiments use a removable storage device (such as a floppy disk, flash drive, etc.) as the permanent storage device. Like the permanent storage device 735, the system memory 725 is a read-and-write memory device. However, unlike storage device 735, the system memory is a volatile read-and-write memory, such a random-access memory. The system memory stores some of the instructions and data that the processor needs at runtime. In some embodiments, the invention's processes are stored in the system memory 725, the permanent storage device 735, and/or the read-only memory 730. From these various memory units, the processing unit(s) 710 retrieves instructions to execute and data to process in order to execute the processes of some embodiments.

The bus 705 also connects to the input and output devices 740 and 745. The input devices enable the user to communicate information and select commands to the electronic system. The input devices 740 include alphanumeric keyboards and pointing devices (also called "cursor control devices"). The output devices 745 display images generated by the electronic system. The output devices include printers and display devices, such as cathode ray tubes (CRT) or liquid crystal displays (LCD). Some embodiments include devices such as a touchscreen that function as both input and output devices.

Finally, as shown in FIG. 7, bus 705 also couples electronic system 700 to a network 765 through a network adapter (not shown). In this manner, the computer can be a part of a network of computers (such as a local area network ("LAN"), a wide area network ("WAN"), or an Intranet, or a network of networks, such as the Internet. Any or all components of electronic system 700 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra-density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

While the invention has been described with reference to numerous specific details, one of ordinary skill in the art will recognize that the invention can be embodied in other specific forms without departing from the spirit of the invention. In addition, some of the figures (including FIG. 4) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

We claim:

1. A method for training a machine-trained (MT) network to classify inputs into a plurality of categories, the method comprising:
   propagating a set of input training items through the MT network to generate a set of corresponding outputs, wherein (i) each respective input training item belongs to a respective category and (ii) the respective output for each respective input training item comprises, for each category, a computed probability of the input belonging to the category;
   computing a value for a loss function based on the generated outputs, the loss function comprising (i) a first term based on the computed probabilities of each respective input belonging to its respective category and not based on individual computed probabilities of the inputs belonging to other categories and (ii) a second term based on the individual computed probabilities of each respective input belonging to each of the categories; and
   using the computed value for the loss function to train the MT network.

2. The method of claim 1, wherein the first term is a cross-entropy term that, for each respective input, is based on a logarithm of the computed probability of the input belonging to its respective category.

3. The method of claim 2, wherein the loss function further comprises a complementary cross-entropy term that, for each respective input, is based on a logarithm of the computed probability of the input not belonging to its respective category.

4. The method of claim 1, wherein each of the loss function terms is continuously differentiable.

5. The method of claim 1, wherein the second term approximates, for each respective input, a maximum of a function applied to each of the individual computed probabilities of the respective input belonging to categories other than its respective category, wherein the function increases as probability increases.

6. The method of claim 1, wherein the second term approximates, for each respective input, a minimum of a function applied to each of the individual computed probabilities of the respective input belonging to categories other than its respective category, wherein the function increases as probability increases.

7. The method of claim 1, wherein the second term is a log-sum-exponent term that emphasizes, for each respective input, a largest of the individual computed probabilities of the respective input belonging to categories other than its respective category.

8. The method of claim 1, wherein the second term is a log-sum-exponent term that emphasizes, for each respective input, a smallest of the individual computed probabilities of the respective input belonging to categories other than its respective category.

9. The method of claim 1, wherein the second term is a regularizing term that, for each respective input, is smallest when the individual computed probabilities of the respective input belonging to categories other than its respective category are evenly distributed.

10. The method of claim 1, wherein the input training items are images and the plurality of different categories are types of objects depicted in the images.

11. The method of claim 1, wherein the input training items are audio recordings and the plurality of different categories are different acoustic scenes in which the audio recordings are captured.

12. The method of claim 1, wherein the loss function for a particular input is minimized for a given computed probability of the input belonging to its category when the computed probabilities of the input belonging to categories other than its respective category are evenly distributed.

13. The method of claim 1, wherein using the computed value for the loss function to train the MT network comprises:
   backpropagating the computed loss function through the MT network to compute gradients of the loss function with respect to each of a plurality of parameters of the network; and
   using the computed gradients to modify the plurality of parameters of the network.

14. A non-transitory machine-readable medium storing a program which when executed by at least one processor trains a machine-trained (MT) network to classify inputs into a plurality of categories, the program comprising sets of instructions for:
   propagating a set of input training items through the MT network to generate a set of corresponding outputs, wherein (i) each respective input training item belongs to a respective category and (ii) the respective output for each respective input training item comprises, for each category, a computed probability of the input belonging to the category;

computing a value for a loss function based on the generated outputs, the loss function comprising (i) a first term based on the computed probabilities of each respective input belonging to its respective category and not based on individual computed probabilities of the inputs belonging to other categories and (ii) a second term based on the individual computed probabilities of each respective input belonging to each of the categories; and using the computed value for the loss function to train the MT network.

15. The non-transitory machine-readable medium of claim 14, wherein:

the first term is a cross-entropy term that, for each respective input, is based on a logarithm of the computed probability of the input belonging to its respective category; and the loss function further comprises a complementary cross-entropy term that, for each respective input, is based on a logarithm of the computed probability of the input not belonging to its respective category.

16. The non-transitory machine-readable medium of claim 14, wherein the second term approximates, for each respective input, a maximum of a function applied to each of the individual computed probabilities of the respective input belonging to categories other than its respective category, wherein the function increases as probability increases.

17. The non-transitory machine-readable medium of claim 14, wherein the second term approximates, for each respective input, a minimum of a function applied to each of the individual computed probabilities of the respective input belonging to categories other than its respective category, wherein the function increases as probability increases.

18. The non-transitory machine-readable medium of claim 14, wherein the second term is a log-sum-exponent term that emphasizes, for each respective input, a largest of the individual computed probabilities of the respective input belonging to categories other than its respective category.

19. The non-transitory machine-readable medium of claim 14, wherein the second term is a log-sum-exponent term that emphasizes, for each respective input, a smallest of the individual computed probabilities of the respective input belonging to categories other than its respective category.

20. The non-transitory machine-readable medium of claim 14, wherein the second term is a regularizing term that, for each respective input, is smallest when the individual computed probabilities of the respective input belonging to categories other than its respective category are evenly distributed.

* * * * *